(12) United States Patent
Kühlmann

(10) Patent No.: US 11,160,257 B2
(45) Date of Patent: Nov. 2, 2021

(54) TOOL-FREE ASSEMBLY FOR A POULTRY HOLDING SYSTEM

(71) Applicant: Franz Josef Kühlmann, Laer (DE)

(72) Inventor: Franz Josef Kühlmann, Laer (DE)

(*) Notice: Subject to any disclaimer, the term of this patent is extended or adjusted under 35 U.S.C. 154(b) by 159 days.

(21) Appl. No.: 16/797,265

(22) Filed: Feb. 21, 2020

(65) Prior Publication Data

US 2020/0187461 A1 Jun. 18, 2020

Related U.S. Application Data

(63) Continuation of application No. PCT/EP2018/072499, filed on Aug. 21, 2018.

(30) Foreign Application Priority Data

Aug. 23, 2017 (DE) .......................... 202017105052.1

(51) Int. Cl.
*A01K 31/22* (2006.01)
*A01K 31/00* (2006.01)

(52) U.S. Cl.
CPC ............ *A01K 31/22* (2013.01); *A01K 31/005* (2013.01); *A01K 2227/30* (2013.01)

(58) Field of Classification Search
CPC .. A01K 2227/30; A01K 31/22; A01K 31/002; A01K 31/18; A01K 31/005
See application file for complete search history.

(56) References Cited

U.S. PATENT DOCUMENTS

| | | | | |
|---|---|---|---|---|
| 2,702,503 | A * | 2/1955 | Wildhaber | A01K 31/17 454/252 |
| 4,020,793 | A * | 5/1977 | Morrison | A01K 31/002 119/479 |
| 4,195,592 | A | 4/1980 | Siciliano | |
| 4,840,142 | A * | 6/1989 | Ishikawa | A01K 1/031 119/458 |
| 8,910,594 | B2 * | 12/2014 | Kuking | A01K 31/007 119/443 |
| 9,538,731 | B2 * | 1/2017 | Rust | A01K 31/22 |
| 2015/0122190 | A1 * | 5/2015 | Rust | A01K 31/165 119/329 |

(Continued)

FOREIGN PATENT DOCUMENTS

| | | | | |
|---|---|---|---|---|
| DE | 6944571 U | 4/1971 | | |
| DE | 3229450 A1 * | 2/1983 | ........... | A01K 31/005 |

(Continued)

*Primary Examiner* — Monica L Barlow
*Assistant Examiner* — Aaron M Rodziwicz

(57) ABSTRACT

A poultry holding system that can be erected tool-free by assembling lengthwise and crosswise members on support posts. Multiple upright support posts are set up in an evenly spaced grid. The crosswise members and lengthwise members are constructed as U-profile rails, with through-holes in the horizontal sections of the U-profiles that allow the members to be assembled and supported on the support posts. The poultry holding system thus constructed can have at least two tiers, one above the other. The assembly components are designed to be particularly economical, which allows greater flexibility in the design and construction of the poultry holding system to accommodate the constraints of the particular facility.

9 Claims, 3 Drawing Sheets

(56) References Cited

U.S. PATENT DOCUMENTS

| | | | |
|---|---|---|---|
| 2015/0122191 A1* | 5/2015 | Rust | A01K 31/165 |
| | | | 119/334 |
| 2017/0231201 A1* | 8/2017 | Rust | A01K 31/12 |
| | | | 119/337 |
| 2018/0007869 A1* | 1/2018 | Rust | A01K 31/00 |

FOREIGN PATENT DOCUMENTS

| | | | | |
|---|---|---|---|---|
| DE | 102015116966 B3 * | 1/2017 | | A01K 31/06 |
| DE | 202018102416 U1 * | 7/2019 | | A01K 31/22 |
| EP | 1616484 A2 | 1/2006 | | |
| EP | 2829745 A1 | 1/2015 | | |
| WO | WO-2014018846 A2 * | 1/2014 | | A01K 31/18 |
| WO | WO-2019229246 A1 * | 12/2019 | | A01K 31/22 |
| WO | WO-2020161315 A1 * | 8/2020 | | A01K 31/005 |

* cited by examiner

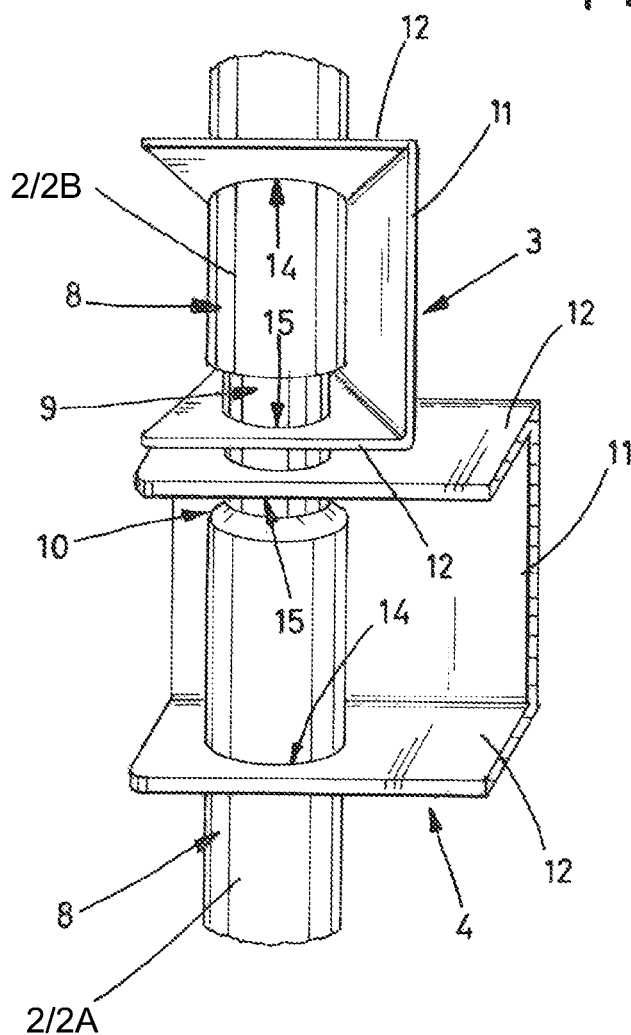
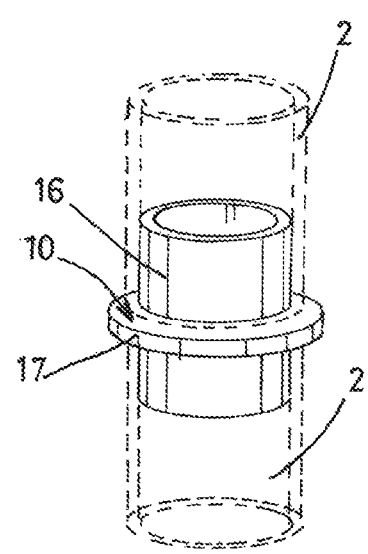

TOOL-FREE ASSEMBLY FOR A POULTRY HOLDING SYSTEM

BACKGROUND INFORMATION

Field of the Invention

The invention relates to a frame of a poultry holding system that is assemblable without the use of tools.

Discussion of the Prior Art

DE 6944571 U1 discloses a screwless poultry holding system that is assembled by fitting or snapping the parts together. This was an improvement over poultry holding systems that required the use of threaded connectors, because the screwless construction of the poultry holding system provided a considerable saving of time and, thus, also a reduction in labor costs.

EP 1616484 A2 and U.S. Pat. No. 4,195,592 A also disclose installations for housing poultry that are constructed with lengthwise and crosswise members that are assembled by snapping or inserting the components together. Also disclosed is the ability to suspend components from the members.

What is needed is an assembly system for erecting a poultry holding system that is tool-free and economical. What is yet further needed is such an assembly system that is easily adaptable to the dimensional constraints of a specific project.

BRIEF SUMMARY OF THE INVENTION

It is an object of the invention to improve upon a conventional poultry holding system that makes the construction of the holding system more economical and easily adaptable.

The components for the poultry holding system according to the invention are designed to be as cost-effective as possible and to be assemblable in a particularly uncomplicated and rapid manner. To this end, the invention provides assembly elements for erecting the frame of the poultry holding system that include support posts and lengthwise and crosswise members that are assembled on the posts. All of these elements are assembled without the use of threaded connectors and tools. The support posts are constructed by assembling as many support post elements as needed, one above the other, to achieve the desired height of the poultry holding system. They are set up in an evenly spaced grid and the lengthwise and crosswise members assembled on the posts to create the frame for the poultry holding system. A shoulder or disk is provided on the support post to provide a support base for the lengthwise and crosswise members.

The support base for the lengthwise and crosswise members may be a shoulder that is integrally formed on the support post or may be a separate component that is used together with support post elements to form the base. Details of the support post will be discussed below, but for the initial discussion on how the members are assembled on the support post, reference will be made to a support post that has a receptacle-end and an insertion end, with a shoulder formed in a transition area between these two ends and that at least two support posts are assembled together to achieve the desired height of the support post by inserting the insertion end of one post into the receptacle end of another post.

Both the lengthwise members and the crosswise members are formed as angle profiles, for example, as open profiles with an L-shape or U-shape cross-section, or as closed profiles with a rectangular cross-section. Examples of suitable material for the lengthwise and crosswise members are commercially available extruded profile rails, made from steel or aluminum. Instead of using the commercially available angle profiles, however, there may be an economic advantage in using sheet metal to make the lengthwise and crosswise members. The use of sheet metal also avoids the design and tool costs that are required to produce non-conventional extruded profiles for a specific project, making such custom-made members economically feasible. The design and construction of the members as angle profiles made from sheet metal may then be specifically adapted to the accommodate the dimensional and load-bearing constraints of the specific planned facility, even those with non-conventional dimensions, yet also be as cost-effective as possible.

In the following description, the angle profiles for the lengthwise and crosswise members are constructed as open, U-shaped profiles. This description of the members as U-profiles is mentioned purely by way of example and without limiting the present invention to that shape.

The U-profiles have two parallel horizontal sections and a vertical section between them, both horizontal sections of the respective U-profile having mutually aligned through-holes. One of the through-holes is dimensioned sufficiently large to slide over the receptacle end of the support post, the other through-hole has a smaller diameter that is dimensioned to slide over the insertion end, but not over the receptacle end. This pair of through-holes on each of the crosswise members and lengthwise members allows a lengthwise and a crosswise member to be assembled together and held in position between two support posts that have been assembled one above the other and to be supported on the shoulder of the lower support post. The U-profile provides a particularly stable assembly, particularly so, when the through-holes are dimensioned to fit over the support post with as little play as possible.

The support posts themselves, as well as the shoulders, may have different cross-sectional geometries, for example rectangular or square, hexagonal, star-shaped, or round, for example, oval or circular. The shoulder may follow the cross-sectional geometry of the support post as a circumferential collar, but it may also have a different cross-sectional geometry. Depending on the shape of the shoulders, the through-holes may be punched holes that have a shape that is not necessarily round. For the sake of simplicity and by way of example only, it is assumed below within the scope of the present invention that the support posts, the shoulders, and also the through-holes in the lengthwise and crosswise members each have a circular cross-section.

It is economically advantageous to make the support posts from a tubular material, rather than a solid material. The use of tubular material requires less material and is, thus, more economical than a rod of the same size would be. This also simplifies the assembly, due to reduced weight and, thus, easier handling of the support posts. It is also advantageous in an engineering sense, because a tubular support post has a higher flexural rigidity than a solid rod of the same size. As a result, a tubular support post with smaller dimensions has the same load-bearing capacity as a support post that is a solid rod, and this fact contributes even more to the above-mentioned advantages.

In one embodiment of the support post according to the invention at least two posts are assemblable, one above the other, by inserting a section of an upper support post into a lower support post, without requiring additional connector elements, which also reduces the costs for the production, assembly and storage of replacement parts. For this type of assembly, the support posts have a first section which extends over most of the length of the support post and that has a larger outer diameter and a second section that has a smaller outer diameter. This first section of the support post is referred to as the receptacle end and the second section as the insertion end and, accordingly, the larger outer diameter is referred to as the receptacle-end diameter and the smaller outer diameter as the insertion-end diameter. An annular shoulder that extends around the base of the insertion end is formed at the transition area between the receptacle-end diameter and the insertion-end diameter. The receptacle end is sleeve-like and thus has a hollow space into which the insertion end of another support post is insertable.

Because the support posts according to the invention are constructed as tubes, it is not necessary to form a bore in the receptacle end. It is economically advantageous to produce the support post, with its receptacle and insertion ends and the shoulder, from a single tube, whereby the tube is deformed at one end to create the smaller diameter of the insertion end and the shoulder.

When straight tubes are used for the support posts, an additional connector element is used to connect two support posts one above the other and to provide the support base for the lengthwise and crosswise members. The connector element has a diameter that fits into both the tubular support post below and the support post above, and has a circumferential collar that prevents connector from sliding completely into the lower tube. The collar has a diameter larger than the outer diameter of the support posts and so, forms the support base between the two support posts, which serves to support the lengthwise and crosswise members assembled on the support posts.

Another suitable way to connect two support posts one above the other is to use a tubular connector that has an inwardly projecting protrusion that allows the section of this connector that is below the protrusion to be inserted into the upper end of a lower support post. The inwardly projecting protrusion ensures that the connector does not slide downwards along the lower support post. A second, upper support post is now insertable from above into the connector. The upper edge of the connector itself may form the shoulder for supporting the lengthwise and crosswise members, or the connector may have an additional, outwardly projecting region that forms this shoulder.

The lengthwise and crosswise members are mounted on a support post with the aid of the through-holes that are aligned vertically. The U-profile of the lengthwise member may differ from the dimensions of the U-profile of the crosswise member, so as to allow one member to fit inside the other member on the support post. In other words, there, where a lengthwise member meets up with a crosswise member on the support post, the end of one member fits inside the other member and the two are then mounted together on the support post. If the U-profiles of both types of members have the same cross-sectional dimensions, so that they cannot be assembled one inside the other, the two members are then assembled offset in height with respect to one another, either by mounting them intermeshed with each other or mounting one member completely above the other member.

The simplest method to assemble the poultry holding system is to assemble the two types of members one above the other, because only a single member needs to be handled at a time and the two members that are to be assembled on a single support post are assembled one after the other i.e., independently of each other. In this case, the assembly of a lengthwise and a crosswise member on the support posts is as follows: A lower support post is positioned in place, with its insertion end extending up. A first member, either a lengthwise or a crosswise member, is assembled from above onto the lower support post, the lower horizontal section of the U-profile having the larger diameter, and moves down the support post until the upper horizontal section, with its smaller diameter, comes to rest against the shoulder on the lower support post. The second member is now assemblable, offset 90 degrees to the orientation of the first member. On this second member, the larger diameter in the U-profile is in the upper horizontal section and the smaller diameter in the lower horizontal section. The upper support post is inserted through the through-hole in the upper horizontal section of the U-profile, leading with its receptacle end, which pushes against the lower horizontal section of the U-profile, forcing the lower horizontal section down against the upper horizontal section of the previously assembled member, until, in the final assembly position, the lower edge of the upper support post, the lower horizontal section of the U-profile of the upper member and the upper horizontal section of the U-profile of the lower member are all supported on the shoulder of the lower support post.

If the angular profiles of the lengthwise and crosswise members are not constructed as U-profiles, but as L-profiles, it is possible to assemble the lengthwise and crosswise members at an almost identical vertical height in a particularly simple manner. However, a height offset of the upright sections of the profiles in relation to the respective other support post is optionally also possible, by mounting lengthwise members with an L-profile in such a way that the upright section of the L is oriented extending either downwards or upwards.

The load of one tier may be increased if the load from the lengthwise members and crosswise members is not transferred directly to the support post shoulders, but instead, is applied across an intermediate disk having a support base that is larger than the diameter of the shoulder. Such an intermediate disk is assembled on the shoulder of a support post, its upper side providing the support base for the lengthwise member or crossmember. The intermediate disk has a central through-hole, for example, a circular through-hole, the diameter of which is greater than the insertion diameter of the support post and smaller than the outer diameter of the support post, and has an outer diameter that is greater than the outer diameter of the support post.

The use of such intermediate disks makes it possible to provide an advantageously large area for force transmission from the respective lengthwise or crosswise member if, for example, the shoulder on the support post is not constructed as a completely circumferential projection. It is possible to create the projection on the outside of a support post by means of an upsetting process that forms the shoulder, and, in particular, two or more such projections may be distributed evenly around the outer circumference of the support post. The material for the intermediate disk and/or the thickness of the material are selected to ensure that the intermediate disk is securely supported on the shoulder and does not deform under the load of the respective member. The intermediate disk, because of its comparatively larger bearing surface for the member, also provides a large-area shoulder on the support post against which the member seats.

Commercially available pipes may be used as support posts, such as so-called inch pipes, which have a round cross section with an outside diameter of approximately 33 mm and ensure sufficient stability for the poultry holding system. In some cases, such pipes are commercially available as semi-finished products that already have an integrally formed insertion end and are, thus, economically obtainable. Such pipes provide a single-component support post, the lower section having an outer diameter that extends over most of the height of the support post, and an upper section that serves as an insertion end, thereby permitting a tool-free assembly of a plurality of support posts to one another, as well as providing the shoulder between the two sections of the pipe where the diameter decreases from the larger outer diameter to the smaller insertion diameter. In a departure from such commercially available round pipes, however, the support posts may also have a polygonal cross-section.

As mentioned above, any number of support posts may be assembled above one another, to obtain the desired height for the poultry holding system, unproblematically and without tools. Ideally, the length of the support posts is relatively short, making it possible to construct tiers of different heights simply by assembling the appropriate number of posts one above another to achieve the desired tier height before assembling the lengthwise and crosswise members on the posts. In the interest of stability, however, the height of a support post preferably corresponds to the height of one tier. In other words, the height of a tier is approximately the length of the support post minus the length of the insertion end. This minimizes the number of connections, which is desirable, because some play may occur at the connections between individual components of the erected installation.

The height of a poultry holding system is determined by the number of tiers, whereas the width of the system is ideally limited to a width that allows optimum access to the entire area within a tier. The length is limited by the spatial constraints of the building where the poultry holding system is housed and is determined by the number of lengthwise members that are assembled one behind the other. It is possible to use crosswise members that have a length that corresponds to the entire width of the poultry holding system. The advantages to this are that a single crosswise member determines the width of the poultry holding system and it is necessary to have support posts only at the two ends of the crosswise members, thereby reducing the number of assembly elements and simplifying the assembly process.

The lengthwise members may be dimensioned to span a smaller distance than the crosswise members, so that the distance between the support posts at the ends of the crosswise member is greater than the distance between two adjacent support posts in the lengthwise direction of the poultry holding system. Also, the lengthwise members and crosswise members do not have to have the same thickness of material. For example, the crosswise members may be made from 2 mm thick material and the lengthwise members from material that is 1.5 mm thick. The support posts in the lengthwise direction may be spaced approximately 1 to 1.5 m apart, for example, 1.2 m apart, whereas the support posts in the crosswise direction may be spaced, for example, 2 to 3 m apart. This flexibility in selecting materials that are sized for a specific project is an advantage when considering the costs of shipping the disassembled components for the poultry holding system according to the invention, because the relatively thinner lengthwise members reduce the total weight of the system.

Additional equipment is frequently assembled on poultry holding systems, for example, water troughs, feed troughs, or perches for the poultry. The poultry holding system according to the invention also allows such equipment to be assembled without the use of tools. For this purpose, suspension areas are provided in central portions of the lengthwise members or the crosswise members from which suspension strips that support water troughs or rods for perches may be suspended.

These suspension areas may be provided as windows that are stamped out or cut out of the central section of a lengthwise member or crosswise member, and the suspension strips may have hook-like projections with which to suspend them in the window. Alternatively, the lengthwise member or crosswise member may have one or more tabs or hook-like protrusions from which the suspension strips may be suspended. An example of such a tab is an upside down U that has been stamped out of the lengthwise member or crosswise member to create an upwardly projecting suspension tab. A suspension strip may be suspended by means of a hook or loop, etc., on the suspension strip that is slipped over the tab or the tab may be bent outward away from the member, to create an outwardly projecting tab.

Reference is made to the process of stamping to remove material from the sheet metal to make the windows or suspension tabs. It is understood that stamping is just one material removal method and other suitable techniques may also be used to create such cut-outs. For example, it is possible to use a laser cutting system to cut the sheet metal, in which case, the so-called stamped out areas are actually cut with lasers and not stamped.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 2 is a partially exploded view of the connections between two support posts and lengthwise and crosswise members.

FIG. 3 illustrates in detail how two support posts are connected, one above the other.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
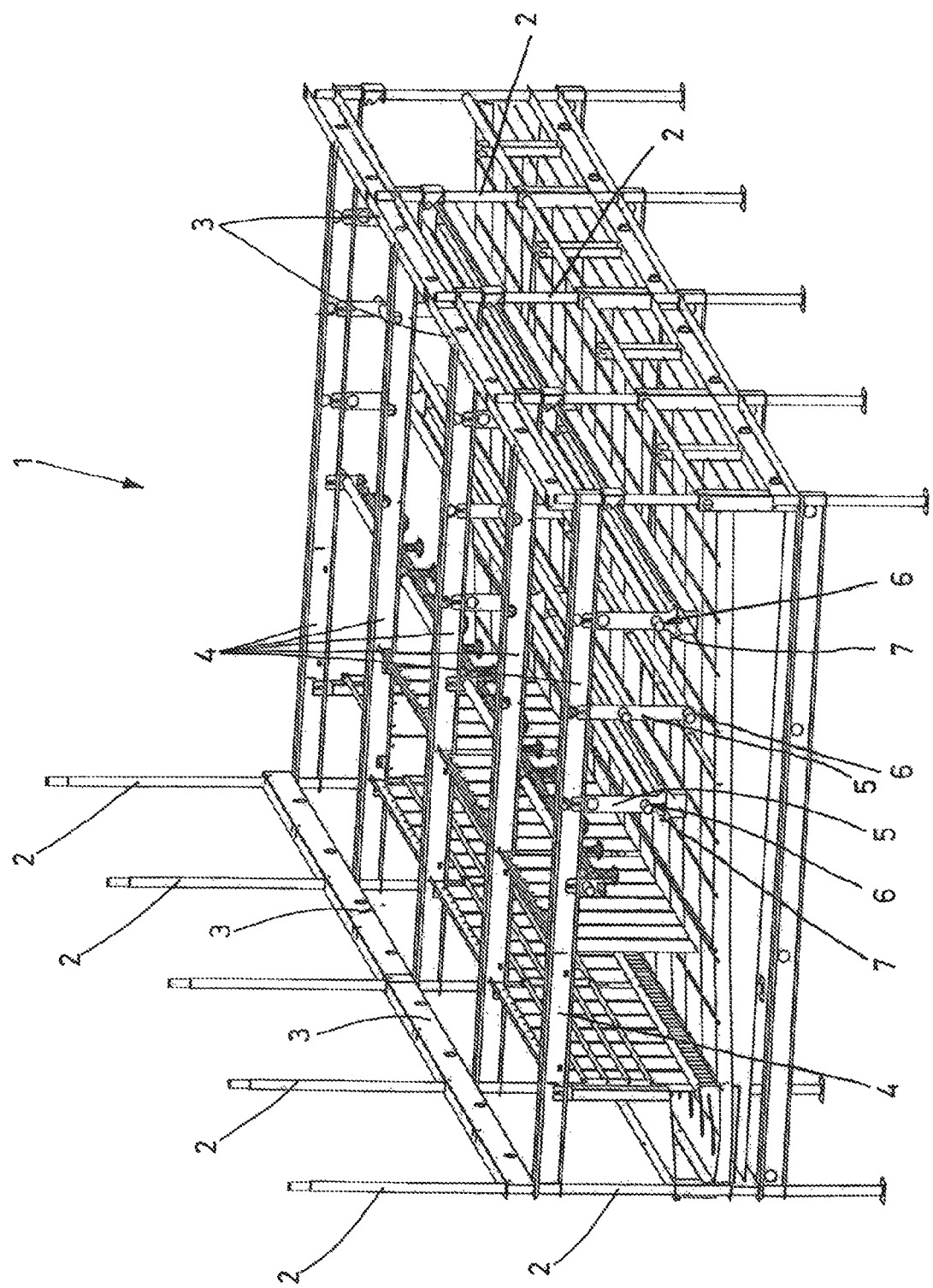
FIG. 1 is a perspective view of a frame of the poultry holding system according to the invention.

FIG. 1 illustrates a poultry holding system 1 according to the invention, in the process of being assemble. The poultry holding system 1 is essentially a frame formed by a plurality of lengthwise members 3, crosswise members 4, and support posts 2, the members being supported on the support posts 2. In this embodiment, one crosswise member 4 extends the total width of the poultry holding system 1 and two lengthwise members 3 define the length of the frame. In the illustration, the poultry holding system 1 has been completed for a bottom tier of holding areas for poultry, and, as can be seen from the height of the support posts 2 on the left side of the illustration, the intention is to assemble at least one more tier in the poultry holding system 1.

Suspension strips 5 are shown suspended from the front crosswise member 4, each strip 5 provided with a through-hole 6 for receiving the end of a rod for a poultry perch. In this illustration, every second suspension strip 5 also has two hooks 7 below the through-hole 6, which are used to suspend other devices, such as water troughs.

FIG. 2 is a partial illustration of two support posts 2, which are designated 2A for the lower support post and 2B for the upper support post when it is necessary to distinguish between the two. The support posts 2 are tubular in construction and have a first cylindrical section 8, which forms a receptacle end at a lower end of a support post 2 and an insertion end 9 at an upper end. The two support posts 2 shown in this illustration are not yet in their final assembled position, the purpose of this exploded view being to show the insertion end 9, which is shown in this illustration only at the upper end of the lower support post 2. In this embodiment, the insertion end 9 is integrally formed above the receptacle end 8. The relatively larger diameter of the receptacle end 8 decreases to a relatively smaller diameter of the insertion end 9 at a transition area between the receptacle end 8 and the insertion end 9, thereby forming a shoulder 10.

Referring still to FIG. 2, one crosswise member 4 is arranged below one lengthwise member 3. In the embodiment shown, each of these members 3, 4 has an approximately U-profile with two horizontal sections 12 extending parallel to one another and a vertical section 11 therebetween. The material thickness of the crosswise member 4 is greater than that of the lengthwise member 3. The crosswise member 4 has a round through-hole referred to as a second or receptacle-end through-hole 14 in the lower horizontal section 12, the diameter of which is dimensioned to fit over the receptacle end 8 of the support post 2 in general and, in this illustration, of the lower support post 2A. An insertion-end through-hole 15, also referred to as a first through-hole, is provided in the upper horizontal section 12 of the crosswise member 4. This insertion-end through-hole 15 has a smaller diameter than the receptacle-end through-hole 14, a diameter that fits around the diameter of the insertion end 9 of the support post 2, but is smaller than the receptacle-end diameter. With these two differently sized through-holes 14, 15, the lower horizontal section 12 with the receptacle-end through-hole 14 of the crosswise member 4 fits over the lower support post 2A and slides down the post until the insertion-end through-hole 15 in the upper horizontal section 12 comes to rest and is supported against the shoulder 10. As mentioned above, this illustration shows the crosswise member 4 before it has reached its final assembled position.

Similarly to the through-holes 14, 15 in the crosswise member 4, the lengthwise member 3 also has an insertion-end through-hole 15 in one of the horizontal sections 12 and a receptacle-end through-hole 14 in the opposite horizontal section 12. The lengthwise member 3 is also shown only partially assembled, suspended above its final assembled position, showing the upper horizontal section 12 with the receptacle-end through-hole 14 fitting over the receptacle end 8 of the upper support post 2B and the lower horizontal section 12 with the insertion-end through-hole 15 around the insertion end 9 of the lower support post 2A.

The receptacle end 8 of the upper support post 2B shown in FIG. 2 is inserted through the round through-hole 14 in the lengthwise member 3 and is pushed onto the insertion end 9 of the lower support post 2A. Together, the receptacle end 8 of the upper support post 2B and the insertion end 9 of the lower support post 2B engage with each other and so provide the connection between the two support posts 2A and 2B. In the fully assembled position, the lower end of the upper support post 2B is seated against the lower horizontal section 12 of the lengthwise member 3 and the lower horizontal section 12 of that lengthwise member 4 is seated against the upper horizontal section 12 of the crosswise member 4, which in turn is supported on the shoulder 10 of the lower support post 2A.

FIG. 3 shows a connector element 16 which has a circumferential collar 17 approximately at the halfway point in the vertical direction. Dashed lines indicate two support posts 2, each of which is constructed as a straight cylindrical tube, connected to one another by means of the connector element 16. The sections of the connector element 16 located above and below the collar 17 are dimensioned to fit into the ends of the support posts 2, thereby serving as a connector between two support posts 2. The collar 17 forms a stop which prevents the connector element 16 from sliding completely into the lower support post 2. In this embodiment, the collar 17 has an outer diameter that extends beyond the outer circumference of the support posts 2, thereby forming a circumferential shoulder 10 which serves as a support base for the lengthwise members 3 and crosswise members 4.

Figure 4:
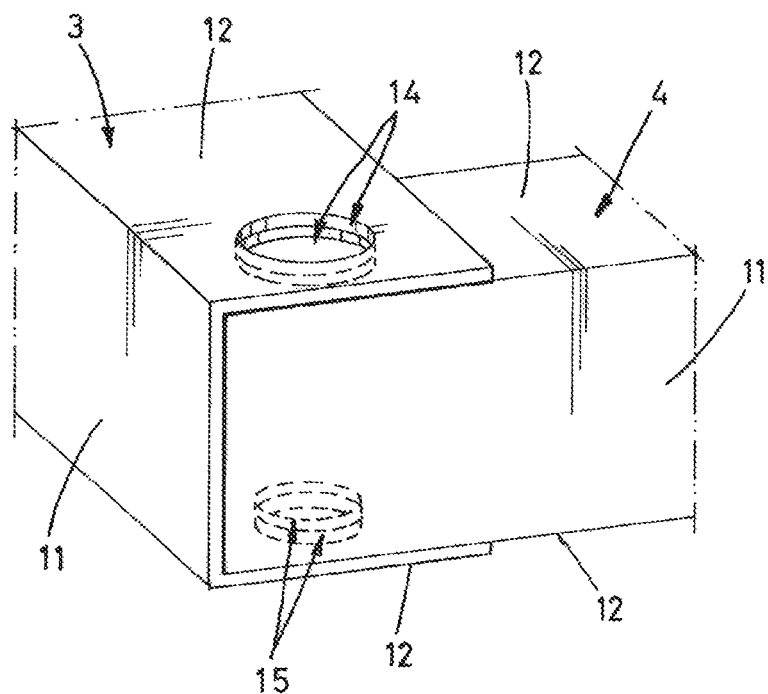
FIG. 4 is a perspective view of how a first embodiment of a lengthwise member and a crosswise member are assembled together to fit on a common support post.
Figure 5:
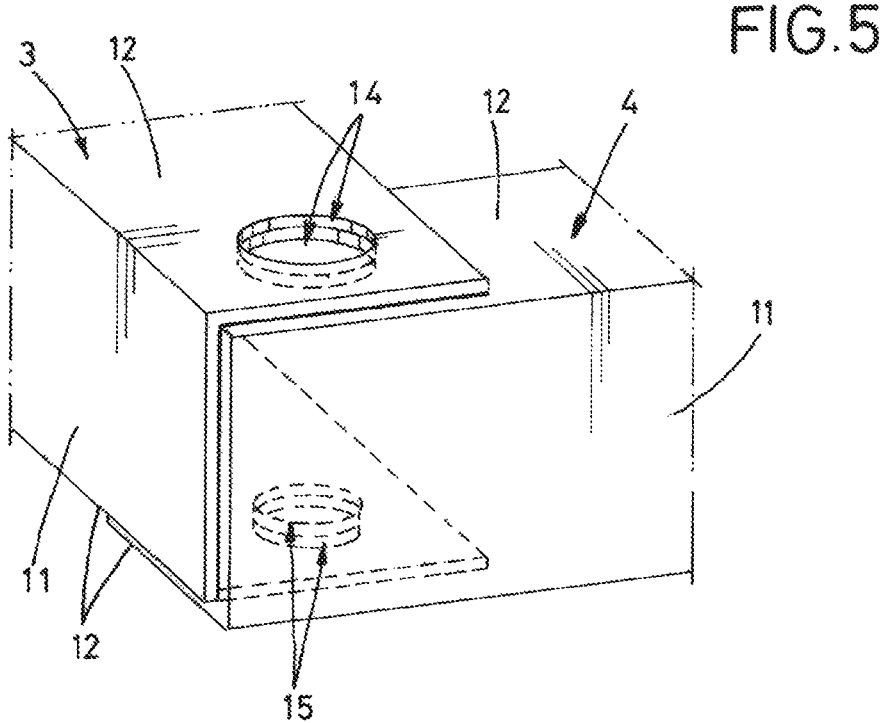
FIG. 5 is a perspective view of how a second embodiment of a lengthwise member and a crosswise member are assembled together to fit on a common support post.

In FIG. 2 the lengthwise and crosswise members 3, 4, are mounted on the support post 2 one above the other. FIGS. 4 and 5, on the other hand, illustrate these two members 3, 4 assembled on the support post 2 at roughly the same height. The second or receptacle-end through-hole 14 is provided in the upper horizontal sections 12 and the first or insertion-end through-hole 15 in the lower horizontal sections 12 of each member 3, 4. In both illustrations, the four through-holes 14, 15 are all vertically aligned with one another. The support posts 2 that extend through these through-holes 14, 15 to support the members 3, 4 are not shown for reasons of clarity.

In the configuration of the lengthwise member 3 and crosswise member 4 shown in FIG. 4, both members 3, 4 have a U-profile, the lengthwise member 3 having a larger profile cross-section than the crosswise member 4. The crosswise member 4 therefore fits within open U of the lengthwise member 3. Each of the vertical sections 11 of the lengthwise and crosswise members 3 and 4 are oriented outwards, that is to say towards the viewer. It is, however, understood, that the crosswise member 4 may be rotated 180° about its vertical axis, so that the open side of the U faces outward, rather than the vertical section 11.

FIG. 5 shows an interlocked configuration of the lengthwise member 3 and the crosswise members 4, both having a U-profile with identically sized profile cross-sections. In this configuration, the crosswise member 4 and lengthwise member 3 are intermeshed with each other, the lower horizontal section 12 of the lengthwise member 3 extending inside and the upper horizontal section 12 of the same member extending outside and across the upper horizontal section 12 of the crosswise member 4. In this configuration, the members 3, 4 are assembled practically at the same height, the offset being equal only to the thickness of the material used to form the lengthwise and crosswise members. This configuration is possible in that the vertical sections 11 of the two lengthwise and crosswise members 3 and 4 are each oriented outwards, that is to say towards the viewer.

It is understood that the embodiments described herein are merely illustrative of the present invention. Variations in the construction of the poultry holding system may be contemplated by one skilled in the art without limiting the intended scope of the invention herein disclosed and as defined by the following claims.

What is claimed is:

1. A poultry holding system comprising:
   a plurality of support posts, each support post constructed as a tube having a receptacle end that has a receptacle-end diameter and an insertion end that has an insertion-end diameter that is smaller than the receptacle-end diameter, and a transition area between the receptacle-end diameter and the insertion-end diameter that forms a shoulder that extends annularly around the support post at the transition area;
   a plurality of longitudinal members and cross members that are assembled on the support posts, each longitudinal member and each cross member constructed as an angle profile rail formed from sheet metal in a U-profile having two horizontal sections that extend parallel to each other and a vertical section therebetween, with a receptacle-end through-hole in one of the two horizontal sections and an insertion-end through-hole in the other one of the two horizontal sections, the receptacle-end through-hole and the insertion-end through-hole in alignment with each other, the receptacle-end through-hole dimensioned to accommodate the receptacle-end diameter of the support post and the insertion-end through-hole dimensioned to fit around the insertion end of the support post and having a diameter smaller than the receptacle-end diameter;
   wherein the plurality of support posts are assembled in an evenly spaced grid and wherein at least two support posts are assembled one above the other;
   wherein the plurality of lengthwise members and crosswise members are assembled on the plurality of support posts so as to provide a tier of the poultry holding system; and
   wherein the poultry holding system has at least two tiers, one above the other.

2. The poultry holding system of claim 1,
   wherein a height of a support post substantially corresponds to a height of the tier.

3. The poultry holding system of claim 1,
   wherein the crosswise member has a material thickness that is greater than a material thickness of the longitudinal member;
   wherein the crosswise member has a length that substantially corresponds to a width of the poultry holding system; and
   wherein at least two lengthwise members are assembled one behind the other and determine a length of the poultry holding system.

4. The poultry holding system of claim 1,
   wherein the lengthwise member and/or the crosswise member has one or more suspension areas formed in the middle section; and
   wherein, a suspension strip is suspended from said one or more suspension areas.

5. The poultry holding system of claim 4,
   wherein the suspension area is constructed as a window that is cut out of an upright section.

6. The poultry holding system of claim 4,
   wherein the suspension area is formed as an inverted U cut-out that is open at the bottom and a tab that is formed by the U cut-out is bent outward to form a suspension tab.

7. The poultry holding of claim 1, further comprising:
   an intermediate disk that has an outer diameter greater than the receptacle diameter of the support post and that is supportable on the shoulder of the support post;
   wherein the lengthwise member and/or the crosswise member is supported on the intermediate disk.

8. The poultry holding system of claim 1,
   the plurality of lengthwise members and the plurality of crosswise members are formed from sheet metal bent to an angular profile.

9. An assembly system for erecting a frame of a poultry holding system, the assembly system comprising:
   a plurality of support posts, each support post constructed as a tube having a receptacle end that has a receptacle-end diameter and an insertion end that has an insertion-end diameter that is smaller than the receptacle-end diameter, and a transition area between the receptacle-end diameter and the insertion-end diameter that forms a shoulder that extends annularly around the support post at the transition area;
   a plurality of longitudinal members and cross members that are assembled on the support posts, each longitudinal member and each cross member constructed as an angle profile rail formed from sheet metal in a U-profile having two horizontal sections that extend parallel to each other and a middle section therebetween, with a receptacle-end through-hole in one of the two horizontal sections and an insertion-end through-hole in the other one of the two horizontal sections, the receptacle-end through-hole and the insertion-end through-hole in alignment with each other, the receptacle-end through-hole dimensioned to accommodate the receptacle-end diameter of the support post and the insertion-end through-hole dimensioned to fit around the insertion end of the support post and having a diameter smaller than the receptacle-end diameter;
   wherein the plurality of support posts are assembled in an evenly spaced grid and wherein at least two support posts are assembled one above the other;
   wherein the plurality of lengthwise members and crosswise members are assembled on the plurality of support posts so as to provide a frame for a tier of the poultry holding system; and
   wherein the U-profile of the plurality of lengthwise members and crosswise members, together with the receptacle-end through-hole and the insertion-end through-hole on the U-profile of the plurality of lengthwise and crosswise members enables selectively assembling one lengthwise member and one crosswise member onto a respective one of the plurality of support posts, either one completely above the other, with a corresponding offset in height, or with the horizontal sections of the one lengthwise member and the one crosswise member interleaved with one another, with only a very slight height offset, between the respective lengthwise member and the crosswise member.

* * * * *